United States Patent [19]

Sun et al.

[11] Patent Number: 5,138,235
[45] Date of Patent: Aug. 11, 1992

[54] STARTING AND OPERATING CIRCUIT FOR ARC DISCHARGE LAMP

[75] Inventors: Yiyoung Sun, Danvers; Long T. Nguyen, Revere, both of Mass.

[73] Assignee: GTE Products Corporation, Danvers, Mass.

[21] Appl. No.: 664,161

[22] Filed: Mar. 4, 1991

[51] Int. Cl.⁵ .......................................... H05B 41/36
[52] U.S. Cl. .............................. 315/209 R; 315/219; 315/307; 315/224; 315/DIG. 7
[58] Field of Search ............... 315/209 R, 276, 219, 315/307, 224, 51, 58, DIG. 7, 225, 224, 101, DIG. 5

[56] References Cited

U.S. PATENT DOCUMENTS

| | | | |
|---|---|---|---|
| 4,066,930 | 1/1978 | Summa | 315/209 R |
| 4,525,648 | 6/1985 | DeBijl et al. | 315/224 |
| 4,647,817 | 3/1987 | Fähnrich et al. | 315/104 |
| 4,647,820 | 3/1987 | Chermin et al. | 315/245 |
| 4,675,576 | 6/1987 | Nilssen | 315/DIG. 7 X |
| 4,677,345 | 6/1987 | Nilssen | 315/209 R |
| 4,857,806 | 8/1989 | Nilssen | 315/72 |
| 4,961,027 | 10/1990 | Müessli | 315/58 |
| 5,023,516 | 6/1991 | Ito et al. | 315/224 X |

FOREIGN PATENT DOCUMENTS 0346782 12/1989 France .

Primary Examiner—Eugene R. Laroche
Assistant Examiner—Ali Neyzari
Attorney, Agent, or Firm—Carlo S. Bessone

[57] ABSTRACT

A circuit for starting and operating a discharge lamp, such as a compact fluorescent lamp, at high frequency from an 60 Hz AC supply. The circuit includes a power supply for generating a DC voltage coupled to a pair of AC input terminals. A DC/AC converter includes an oscillator having a pair of semiconductor switches coupled in parallel with the DC power supply. an oscillator starting circuit is coupled to one of the semiconductor switches and includes a series circuit comprising a resistor, capacitor and threshold element. The input of the oscillator starting circuit is coupled to one of the AC input terminals so as to prevent a momentary flicker in the lamp after the AC supply is removed and the lamp has extinguished. In accordance with another aspect of the invention, the oscillator includes fusible circuit elements which render the oscillator inoperable upon failure of the lamp due to depletion of emissive material on at least one of the lamp electrodes.

10 Claims, 1 Drawing Sheet

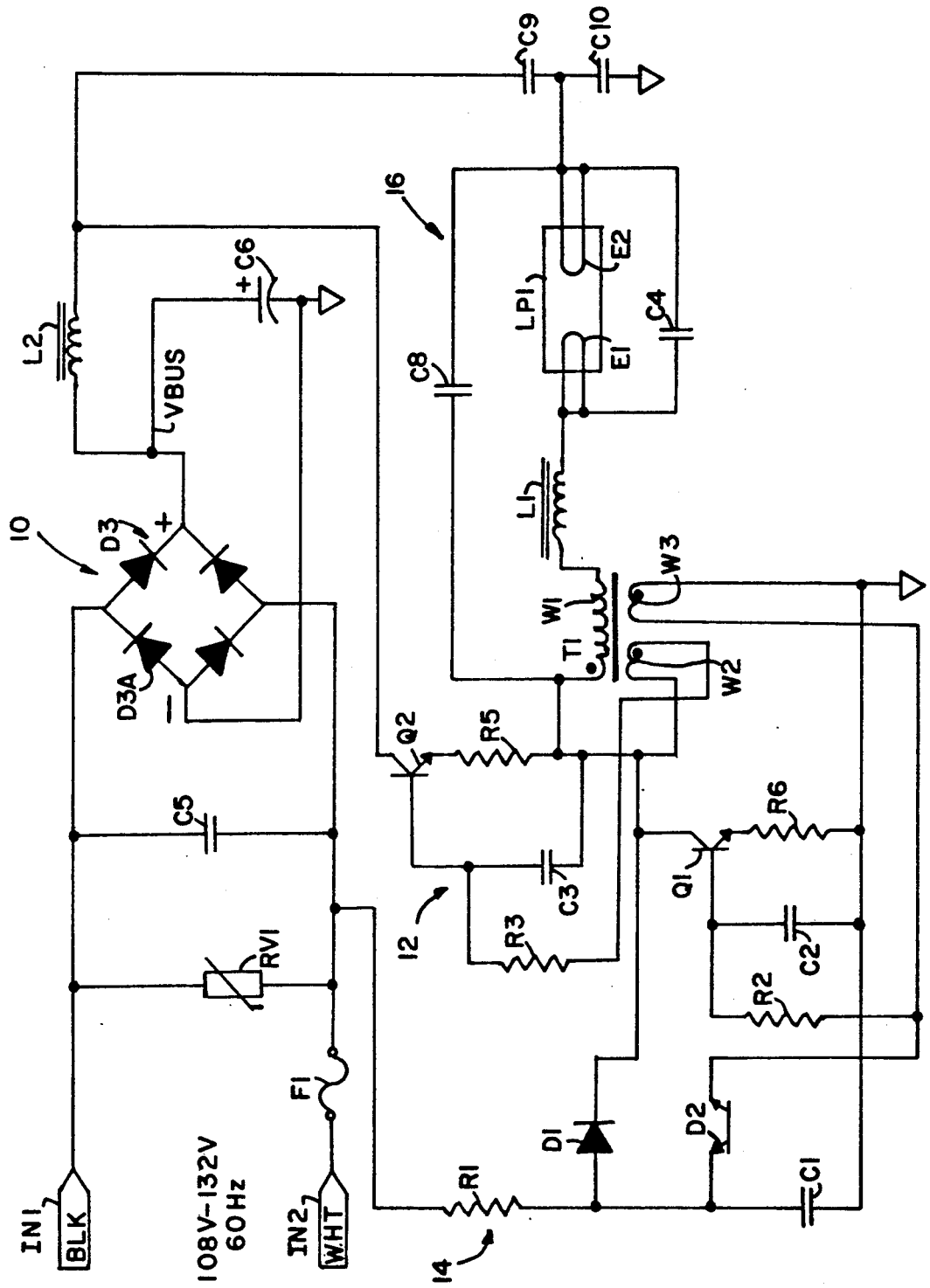

STARTING AND OPERATING CIRCUIT FOR ARC DISCHARGE LAMP

FIELD OF THE INVENTION

This invention relates to low-pressure discharge lamps, particularly fluorescent lamps, and especially to starting and operating circuitry for compact fluorescent lamps.

BACKGROUND OF THE INVENTION

Various types of operating circuits are known to start and operate compact fluorescent lamps. One type of circuit is illustrated in the FIG. 7 schematic of French Publication No. 0346782. This schematic is similar, in general principle, to the state of the art as practised in a lamp sold by the Osram Company under the registered trademark "DULUX EL" or in the lamp of the Philips Company which bears the denomination "PLC 20 Electronic". Using the circuit of French Publication 0346782 as an example of such circuits, after the two input terminals of the DC/AC converter (or oscillator) are energized by a DC voltage which appears across a filter capacitor, the starting capacitor C5 charges through a starting resistor R3 to a voltage which is substantially equal to the threshold voltage of the threshold element (i.e., the diac). The threshold element breaks down and supplies a pulse to the base terminal of transistor T2. As a result, transistor T2 begins to conduct. A current flows through transistor T2 and the load circuit. Subsequently, this transistor becomes non-conducting and the other transistor T1 becomes conducting. This process is then continuously repeated. This leads to an oscillation, i.e., an alternating current through the load circuit which includes the discharge tube.

It has been discovered that disadvantages may appear in some circuits similar to those described above. For example, when power to the circuit is removed, a momentary blink or flicker in the lamp may occur immediately after the tube is extinguished. It has been observed that when AC power to the circuit is removed, a voltage initially remains on the filter capacitor of the DC power supply. This filter capacitor voltage gradually depletes to a point (usually greater than the starter threshold voltage) where the oscillator shuts down. However, the starting capacitor is allowed to recharge to a point where the threshold element of the starting circuit triggers causing the oscillator to conduct for a short period of time. Consequently, the discharge tube will blink or flicker as a result of current from the filter capacitor flowing through the conducting transistors and load circuit. This conduction continues for approximately 10 msecs. until the filter capacitor voltage is less than the starter's trigger voltage.

Another disadvantage may appear in circuits similar to those described above at the end of lamp life when the emissive material on one or both of the filament electrodes has depleted. Although a discharge is unable to be established between the lamp electrodes, the oscillator may continue to conduct current through circuit components causing an unnecessary consumption of power until, for example, the AC power source is disconnected or the lamp and tank capacitor are removed from the load circuit. In the instances where the lamp is permanently connected, such as in an integral lamp unit, this latter option is unavailable.

SUMMARY OF THE INVENTION

It is, therefore, an object of the present invention to obviate the disadvantages of the prior art.

It is still another object of the invention to provide an improved circuit for starting and operating a discharge lamp.

It is another object of the invention to provide an improved circuit which does not result in a momentary blink or flicker in the lamp immediately following the removal of AC power from the circuit.

It is still another object of the invention to provide an improved circuit which does not cause an unnecessary power consumption upon an end-of-life condition caused by the depletion of emissive material on one or both of the lamp filament electrodes.

These objects are accomplished in one aspect of the invention by the provision of a starting and operating circuit for a discharge lamp comprising a pair of AC input terminals adapted to receive an AC signal from an AC supply and a DC power supply coupled to the AC input terminals for generating a DC voltage. An oscillator includes a pair of semiconductor switches and is coupled to the DC power supply so as to receive the DC voltage. An oscillator starting circuit is coupled to one of the semiconductor switches. The oscillator starting circuit includes a series circuit comprising a resistor and a capacitor connected together and a threshold element connected to the junction point of the RC starting circuit. The input to the oscillator starting circuit is coupled to one of the AC input terminals so that the capacitor means is charged only on one half cycle of the AC signal. A load, which includes the discharge lamp, is coupled to the output of the oscillator.

In accordance with further teachings of the present invention, the load further includes a tank capacitor in parallel with the lamp and a tank inductor in series with the parallel combination of the tank capacitor and lamp. The tank inductor and tank capacitor form a resonant circuit having a resonant frequency greater than the switching frequency of the oscillator.

In accordance with another aspect of the present invention, the oscillator further includes a fusible circuit element to inhibit further operation of the oscillator upon failure of the lamp due to depletion of emissive material on at least one of the lamp electrodes.

In accordance with further aspects of the present invention, each of the semiconductor switches includes a first resistor connected in series with the output thereof and a second resistor connected to the input thereof. Preferably, both the first and second resistors are fusible type resistors.

Additional objects, advantages and novel features of the invention will be set forth in the description which follows, and in part will become apparent to those skilled in the art upon examination of the following or may be learned by practice of the invention. The aforementioned objects and advantages of the invention may be realized and attained by means of the instrumentalities and combination particularly pointed out in the appended claims.

BRIEF DESCRIPTION OF THE DRAWINGS

The invention will become more readily apparent from the following exemplary description in connection with the accompanying FIGURE. This FIGURE represents a schematic diagram of a preferred embodiment of a starting and operating circuit for a discharge lamp according to the present invention.

BEST MODE FOR CARRYING OUT THE INVENTION

For a better understanding of the present invention, together with other and further objects, advantages and capabilities thereof, reference is made to the following disclosure and appended claims in connection with the above-described drawings.

The sole FIGURE represents a schematic diagram of a preferred embodiment of a starting and operating circuit for a discharge lamp LP1 Lamp LP1 is an arc discharge lamp such as a low-pressure fluorescent lamp having a pair of opposing filamentary electrodes E1, E2. Each of the filamentary electrodes is coated during manufacturing with a quantity of emissive material. Lamp LP1, which forms part of a load circuit 16, is ignited and fed via an oscillator 12 which operates as a DC/AC converter. Oscillator 12 receives filtered DC power from a DC power supply 10 which is coupled to a source of AC power. Conduction of oscillator 12 is initiated by a starting circuit 14. The circuit will be described in more detail below.

A pair of input terminals IN1, IN2 are connected to an AC power supply such as 108 to 132 volts, 60 Hz. A transient suppressor RV1 is shunted across input terminals IN1, IN2 in order to absorb any surge energy that may otherwise cause damage to the circuit. The AC input power is coupled by way of a fuse F1 to the input of DC power supply 10 which consist of diode rectifier bridge D3 and a filter capacitor C6. Capacitor C6 filters the rectified AC voltage so that the bus voltage (VBUS) is a DC voltage with minimal low frequency modulation which serves to minimize lamp current crest factor. A capacitor C5, which is connected in parallel with transient suppressor RV1 and the input to DC power supply 10, and an inductor L2 connected to the positive output terminal of DC power supply 10 serve to suppress EMI generated by oscillator 12.

Oscillator 12, which includes (as primary operating components) a pair of series-coupled semiconductor switches, such as bipolar transistors Q1, Q2 or MOSFETS (not shown), is coupled in parallel with the output of DC power supply 10. The collector of transistor Q2 is connected to one end of inductor L2 while the emitter of transistor Q2 is connected to one end of a resistor R5. The other end of resistor R5 is connected to the collector of transistor Q1. The emitter of transistor Q1 is coupled to circuit ground through a resistor R6. During lamp operation, emitter resistors R5 and R6 minimize lamp current variations caused by temperature. More specifically, as the junction temperatures of transistors Q1 and Q2 increase due to increases in ambient temperature, the base-emitter voltages of Q1 and Q2 tend to decrease. As a result, the voltage drop across resistors R5 and R6 increases and thereby compensates for the decrease in the base-emitter voltage. Consequently, the lamp current will remain relatively constant with temperature. In addition to compensating for temperature variations, resistor R6 acts to limit the current through transistor Q1 at initial startup.

Base drive and switching control for transistors Q1 and Q2 are provided by secondary windings W2, W3 of a saturable transformer T1, base resistors R2 and R3, and capacitors C2 and C3. The values of resistors R2 and R3 are chosen so that transistor control or base leads are properly driven.

Oscillator starting circuit 14 includes a series arrangement of a resistor R1 and a capacitor C1. The junction point between resistor R1 and capacitor C1 is connected to a bidirectional threshold element D2 (i.e., a diac). One end of threshold element 12 is coupled to the base terminal of transistor Q1 through base resistor R2. As illustrated in the FIGURE, the input of the oscillator starting circuit 12 (i.e., the upper end of resistor R1) is connected to one of the terminals (e.g., IN2) applied to the AC power supply.

During normal lamp operation, oscillator starting circuit 14 is rendered inoperable due to a diode rectifier D1 connected to the junction point of resistor R1 and capacitor C1. During lamp operation, diode rectifier D1 holds the voltage across starting capacitor C1 at a level which is lower than the threshold voltage of threshold element D2. The time constant of R1 and C1 should be longer than the operating frequency of the oscillator in order to insure that capacitor C1 does not recharge during normal operation to the threshold voltage of element D2.

Series capacitors C9 and C10 form one of the two legs of the half-bridge topology. The other leg being formed by the series coupled transistors Q1 and Q2. Unlike conventional half-bridge circuits in which the two capacitors are the main energy reservoirs, in the present circuit capacitors C9 and C10 function as a voltage divider and help shunt EMI/RFI noise generated by transistors Q1 and Q2.

Load circuit 16 comprises a series combination of a primary winding W1 of transformer T1 and an inductor L1 connected in series with a parallel combination formed by lamp LP1 and a capacitor C4. Inductor L1 comprises the principle ballasting element for the lamp. The saturation of transformer T1 influences the switching frequency of transistors Q1 and Q2. Typically, the transistor switching frequency is from about 25 Khz to 39 Khz. Preferably, the switching frequency is about 30 Khz. During lamp operation, the impedance of capacitor C4 is much higher than the impedance of the lamp, so capacitor C4 acts as an open circuit. The total load impedance is the sum of the impedance of inductor L1 and the lamp impedance in series, which will make the lamp current a sawtooth waveform. The resonant frequency during normal operation is very different from the resonant frequency during startup. In one example, the resonant frequency during startup is about 46 Khz, but during operation the resonant frequency is about 0.25 Hz.

As is conventional in instant-start lamp operation, the two terminals from each lamp electrode are connected together. Load circuit 16 further includes a capacitor C8, connected across the circuit arrangement of primary winding W1, inductor L1, lamp LP1 and capacitor C4. Capacitor C8 forms a single element snubber circuit which reduces the rise time and thus the switching losses of transistors Q1 and Q2. As a result of the reduction in rise time (or equivalent reduction in $dV_{ce}/dt$) of transistors Q1 and Q2, high voltage spikes which normally generate EMI/RFI noise are reduced.

The operation of the circuit will now be discussed. When terminals IN1 and IN2 are connected to a suitable AC power source, DC power source 10 rectifies and filters the AC signal and develops a DC voltage (VBUS) across capacitor C6. Simultaneously, during the negative half cycle of the AC input signal, starting capacitor C1 begins to charge through resistor R1 to a voltage which is substantially equal to the threshold voltage of the threshold element D2. Upon reaching the threshold voltage (e.g., 32 volts), the threshold element breaks down and supplies a pulse to the input or base terminal of transistor Q1. As a result, current from the Vbus supply flows to circuit ground through inductor L2, capacitor C9, capacitor C4, ballast inductor L1, primary winding W1 of transformer T1, the collector-emitter junction of transistor Q1 and emitter resistor R6. Since the lamp is essentially an open circuit during starting, no current flows through the lamp at this time. Current flowing through primary winding W1 causes saturation of the core of transformer T1 which forces the inductance of the transformer T1 to drop to zero. A resulting collapse in the magnetic field in transformer T1 result in a reverse in polarity on secondary windings W2 and W3 of transformer T1. As a result, transistor Q1 is turned off and transistor Q2 is turned on. Current now flows to ground through inductor L2, the collector-emitter junction of transistor Q2, emitter resistor R5, primary winding W1 of transformer T1, ballast inductor L1, capacitors C4 and C10. This process is repeated causing a high voltage to be developed across capacitor C4 (and lamp LP1) as a result of a series resonant circuit formed by capacitors C4, C9, C10 and ballast inductor L1. The high voltage developed across capacitor C4 is sufficient to ignite lamp LP1. In addition to igniting lamp LP1, capacitor C4 improves lamp current crest factor.

During normal lamp operation, oscillator starting circuit 14 is rendered inoperable due, in part, to rectifier D1 which holds the voltage across starting capacitor C1 at a level which is lower than the threshold voltage of threshold element D2. Any charge developed across starting capacitor C1 during this period is continuously discharged to circuit ground through diode D1, the collector-emitter junction of transistor Q1 and emitter resistor R6. In addition, the time constant of R1 and C1 is selected to be longer than the operating frequency of the oscillator so that capacitor C1 will not recharge through resistor R1 to a level to retrigger diac D2.

When AC input power to the circuit is removed, starting capacitor C1 is unable to receive energy from filter capacitor C6 since the input to the starting circuit (i.e., the upper end of resistor R1) is connected to one of the input terminals IN2. As a result, current from the filter capacitor will be unable to flow through the conducting transistors and load circuit to otherwise cause the lamp to momentarily blink or flicker after the lamp has extinguished.

It is noted that capacitor C1 charges only when the AC input voltage on input terminal IN2 is positive with respect to input terminal IN1. During this half cycle of the AC supply, current flows from input terminal IN2, through fuse F1, resistor R1, capacitor C1, diode leg D3A (of diode rectifier bridge D3) to input terminal IN1. No charge path for capacitor C1 is provided when the AC input voltage on input terminal IN2 is negative with respect to input terminal IN1. In addition to preventing the momentarily blink or flicker discussed above, the power dissipated by resistor R1 is reduced since resistor R1 only sees 60 Hz half wave voltage.

In circuits similar to those described above, power may continue to be consumed in the oscillator upon an end-of-life condition caused by the depletion of emissive material on one or both of the lamp filament electrodes if the electrodes and lamp envelope remain intact. When the emissive material on the lamp electrode is depleted, the lamp acts as an open circuit element.

The circuit will then run in a series resonant mode with resonant elements of inductor L1 and capacitor C4. By the nature of any series resonant circuit, the combined impedance of inductor L1 and capacitor C4 is zero. The only noticeable impedance in the circuit is the emitter resistor, the winding resistance of inductor L1 and the collector-emitter resistance. The combination of these resistances is very small (i.e., smaller than 10 ohms). Basically, the circuit is in a short circuit mode. The short circuit current of transistors Q1 and Q2 will be very high. For example, when Vbus is equal to 169 VDC and the short circuit resistance is equal to 10 ohms, the short circuit current will be 169/10=16.9 amps.

In accordance with the teachings of the present invention, base drive resistors R2 and R3 are fusible type resistors. Emitter resistors R5 and R6 may also be fusible type resistors. As a result of the increased current flow, one of the fusible resistors creates an open circuit and thereby inhibit operation of the oscillator.

As a specific example but in no way to be construed as a limitation, the following components are appropriate to an embodiment of the present disclosure, as illustrated by the FIGURE.

| Item | Description | Value |
|------|-------------|-------|
| C1 | Capacitor | 0.047 MFD, 50 VDC |
| C2 | Capacitor | 0.047 MFD, 50 VDC |
| C3 | Capacitor | 0.047 MFD, 50 VDC |
| C4 | Capacitor | 0.01 MFD, 630 VDC/220 VAC |
| C5 | Capacitor | 0.022 MFD, 250 VAC |
| C6 | Capacitor | 47 MFD, 200 VDC |
| C8 | Capacitor | 2200 PFD, 250 VDC/160 VAC |
| C9 | Capacitor | 0.22 MFD, 160 VDC/100 VAC |
| C10 | Capacitor | 0.22 MFD, 160 VDC/100 VAC |
| D1 | Diode | 1.0 A, 600 V |
| D2 | Diac | 2 A, 32 V, (BR100/03) |
| D3 | Bridge | 1.5 A, 600 V (1N4005) |
| R1 | Resistor | 510 Kohm, ¼ W |
| R2 | Resistor | 10 ohm, ¼ W Fusible (Philips NFR25) |
| R3 | Resistor | 10 ohm, ¼ W Fusible (Philips NFR25) |
| R5 | Resistor | 1.3 ohm, ¼ W Fusible (Philips NFR25) |
| R6 | Resistor | 1.3 ohm, ¼ W Fusible (Philips NFR25) |
| RV1 | MOV | 150 VAC, 1200 A V150LA2 |
| F1 | Fuse | 2.5 A, 125 V |
| Q1 | Transistor | 5.0 A, 850 V (BUV46) |
| Q2 | Transistor | 5.0 A, 850 V (BUV46) |
| L1 | Inductor | 1.2 mH |
| L2 | Inductor | 1.0 mH |
| T1 | Transformer | 6 turns prim. 5 turns each sec. |

There has thus been shown and described a circuit for starting and operating an arc discharge lamp. The invention does not result in a momentary blink of the lamp immediately following the removal of power from the circuit. Also, the circuit does not cause an unnecessary use of energy due to continued oscillator operation upon an end of lamp life condition caused by the depletion of emissive material on one of the lamp filament electrodes.

While there have been shown and described what are at present considered to be the preferred embodiments of the invention, it will be apparent to those skilled in the art that various changes and modifications can be made herein without departing from the scope of the invention. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the inven-

What is claimed is:

1. A starting and operating circuit for a discharge lamp comprising:
 a pair of AC input terminals adapted to receive an AC signal from an AC power supply;
 DC power supply means coupled to said AC input terminals for generating a DC voltage;
 oscillator means including a pair of semiconductor switches coupled to said DC power supply to receive said DC voltage;
 oscillator starting means coupled to one of said semiconductor switches, said oscillator starting means having an input and including a series circuit comprising resistor means and capacitor means connected at a junction point and a threshold element means connected to said junction point, the input of said oscillator starting means being coupled to one of said AC input terminals so that said capacitor means is charged only on one half cycle of said AC signal; and
 load means coupled to the output of said oscillator means and including said discharge lamp.

2. The starting and operating circuit of claim 1 wherein said input to said oscillator starting means is one end of said resistor means.

3. The starting and operating circuit of claim 1 wherein said resistor means is a resistor and said capacitor means is a capacitor.

4. The starting and operating circuit of claim 1 wherein said threshold element means is a diac.

5. The starting and operating circuit of claim 1 wherein said load means further includes tank capacitor means in parallel with said lamp and tank inductor means in series with the parallel combination of said capacitor means and said lamp, said inductor means and said capacitor means having a resonant frequency greater than the switching frequency of said oscillator means.

6. The starting and operating circuit of claim 1 wherein said oscillator means operates at a frequency of from about 25 Khz to 39 Khz.

7. The starting and operating circuit of claim 6 wherein said oscillator means operates at a frequency of about 30 Khz.

8. A starting and operating circuit for a discharge lamp having a pair of electrodes adapted to receive a quantity of emissive material, said circuit comprising:
 a pair of AC input terminals adapted to receive an AC signal from an AC power supply;
 DC power supply means coupled to said AC input terminals for generating a DC voltage;
 oscillator means coupled to said DC power supply and including a pair of semiconductor switches, each of said semiconductor switches having first resistor means connected in series with the output thereof and second resistor means connected to the input thereof, said first resistor means or said second resistor means of each of said semiconductor switches being a fusible type resistor operable to inhibit said oscillator means upon failure of said lamp due to depletion of emissive material on at least one of said lamp electrodes;
 oscillator staring means coupled to one of said semiconductor switches; and
 load means coupled to the output of said oscillator means and including said discharge lamp.

9. The starting and operating circuit of claim 8 wherein said first resistor means and said second resistor means of each of said semiconductor switches are fusible type resistors.

10. An arrangement comprising:
 a pair of AC input terminals adapted to receive an AC signal from an AC power supply;
 DC power supply means coupled to said AC input terminals for generating a DC voltage;
 oscillator means coupled to said DC power supply and including a pair of semiconductor switches and fusible circuit means,
 oscillator starting means coupled to one of said semiconductor switches, said oscillator starting means having an input and including a series circuit comprising resistor means and capacitor means, said input of said oscillator starting means being coupled to one of said AC input terminals so that said capacitor means is charged only on one half cycle of said AC signal;
 load means coupled to the output of said oscillator means, said load means including a fluorescent lamp having a pair of electrodes adapted to receive a quantity of emissive material;
 said fusible circuit means being operable to inhibit said oscillator means upon failure of said lamp due to depletion of emissive material on at least one of said electrodes.

* * * * *